United States Patent [19]

Maroudas

[11] Patent Number: 5,143,742

[45] Date of Patent: Sep. 1, 1992

[54] PROCESS FOR PRODUCING A DAIRY PRODUCT USABLE AS A SPREAD

[76] Inventor: Johann Maroudas, Nordfelder Reihe 20, 3000 Hannover, Fed. Rep. of Germany

[21] Appl. No.: 772,282

[22] Filed: Oct. 7, 1991

Related U.S. Application Data

[63] Continuation-in-part of Ser. No. 359,404, May 31, 1989, abandoned.

[30] Foreign Application Priority Data

May 31, 1988 [DE] Fed. Rep. of Germany ....... 3818421
Apr. 21, 1989 [DE] Fed. Rep. of Germany ....... 3913125

[51] Int. Cl.$^5$ .......................... A23C 23/00; A23D 7/02
[52] U.S. Cl. ...................................... 426/585; 426/42; 426/43; 426/491; 426/603
[58] Field of Search ............... 426/491, 585, 588, 589, 426/603, 42, 43

[56] References Cited

U.S. PATENT DOCUMENTS

| | | | |
|---|---|---|---|
| 3,080,236 | 3/1963 | Ferguson, Jr. | 426/588 |
| 3,922,376 | 11/1975 | Strinning et al. | 426/603 |
| 4,434,184 | 2/1984 | Kharrazi | 426/583 |
| 4,473,594 | 9/1984 | Miller et al. | 426/583 |
| 4,515,825 | 5/1985 | Moran et al. | 426/583 |

FOREIGN PATENT DOCUMENTS 226756 1/1984 Fed. Rep. of Germany.

Primary Examiner—Jeanette Hunter
Assistant Examiner—Helen Pratt
Attorney, Agent, or Firm—Robert E. Burns; Emmanuel J. Lobato

[57] ABSTRACT

The invention relates to a process for the production of a food product, that in particular is usable as a bread spread, creamy food and/or a base material for the production of specialties, consisting predominantly of milk protein, oil and water. It is the object of the invention to create an easily produced pure natural product of creamy to solid consistency which contains little fat and much protein and is usable in a variety of ways as a bread spread and as a food product. In the process of the invention, curds, yogurt or other milk protein in flocculent form is dehydrated, to the dehydrated product an edible oil is added and then stirred until a product of creamy to solid consistency is obtained. This obtained product is usable as a bread spread as well as a creamy food in a variety of tastes through the use of additives of particular kinds such as sugar, fruit sugar, fruits, herbs and vegetables, but also meat and cheese.

13 Claims, No Drawings

PROCESS FOR PRODUCING A DAIRY PRODUCT USABLE AS A SPREAD

REFERENCE TO PRIOR APPLICATION

This is a continuation-in-part of application Ser. No. 07/359,404, filed May 31, 1989, abandoned.

FIELD OF INVENTION

The invention relates to a process for the production of a food product that is usable in particular as a spread for bread, creamy food and/or a base material for the production of, specialties, consisting predominently of milk protein, unsaturated vegetable oil and water.

BACKGROUND OF THE INVENTION

A similar food product is known in the form of margarine which is an emulsion of fat, oil and water particles. Almost 20% water and/or skimmed fresh milk are uniformly distributed in the fat used (at least 80%) in the margarine in the form of fine droplets. The fat, which is solid at normal temperatures, gives this emulsion the soft form, for it surrounds the liquid oil and the water as a honeycomb. Margarine is produced today predominantly of vegetable material. Besides the liquid oils, fats are used which in our latitude can be regarded as solid oil. However, as sufficient solid fats are not available from nature, a part of the oil is converted through hardening to solid form of the desired melting point.

This hardening of the oil is regarded as a considerable disadvantage. On the one hand it is a chemical action on the fatty acids which denaturalizes the product in a certain manner, on the other hand, for the hardening, nutritionally advantageous unsaturated fatty acids are converted into nutritionally less desirable saturated fatty acids. The nickel catalyst mixed with the oil for the hardening is filtered out after the hardening but, however, a minimal residue remains which is regarded as a further disadvantage by nutritional scientists.

If margarine is used as a bread spread, the high fat content of 80% disturbs many users. On this ground there has been developed a half-fat-margarine which contains only half as much fat. Through the additional water content there is achieved a calorific value reduction but at the cost of the taste of the product.

In spite of these in the publicity not unknown disadvantages, margarine is widely used not so much on account of its lower price as much more on account of the use of non-animal fat to a large extent. That happens because no other bread spread of creamy to solid consistency is present which can be spread similarly to butter but contains less fat and therefore more protein.

While butter and margarine bread spread are of relatively neutral taste so that they bring further overlays of wurst, cheese, curds and specialties produced from these to their full taste, there is a line of curd and cheese specialties which also serve as bread spreads but on account of their taste can never replace margarine or butter.

An example of this is a sour milk cheese named Labneh previously produced in Egypt, in the production of which olive or cottonseed oil and lemon juice were added in various amounts for taste. In Lebanon, Jordan and Syria this sour milk cheese is still produced from Labban, a yogurt-like sour milk, through draining. This sour milk cheese produced by draining flocculent sour milk protein together with edible oil has a strong cheese taste. It can never replace margarine as a neutral taste base for the production of specialties.

A further example is the process known from DE 32 26 756 A 1 for the production of Tsaziki by which curds are mixed first with small pieces of fresh cucumbers then with garlic and finally mixed with edible oil.

SUMMARY OF THE INVENTION

The invention avoids the disadvantages of the state of the art. It is the object of the invention to provide an easily produced pure natural product of creamy to solid consistency which is neutral in taste and contains little fat but much protein and that on account of its neutral taste is usable as a bread spread such as butter or margarine but is also usable as a base for the production of specialties.

The invention consists in dehydrating water from curds, yogurt, kefir or other substance containing milk protein in flocculent form to reduce its weight 50% to 85%, preferably 50% to 70%, to the resulting dehydrated product unsaturated vegetable oil is added and then stirred at room temperature without the addition of external heat until there is obtained a product of soft, creamy consistency with a solidity similar to butter or margarine.

This food product contains much protein but only little fatty acid. The content of unsaturated vegetable oil can be of a value of from 4 to 40% whereby vegetable oil with a high content of one or more unsaturated fatty acids comes into use. As a hardening of the vegetable oil is here wholly superfluous, nickel catalyst need not be used. This food product is thus much more a pure natural product of which the ingredients need not be chemically altered in order to obtain the desired creamy to solid consistency. Thereby this natural product has an especially high nourishment value. It can be used as a bread spread as well as a creamy food and/or as a food base for the production of different specialties.

In the production it is advantageous to continue the stirring until the essential part of the stirred mass is in direct chemical combination, eventual addition compound between the protein molecules and oil molecules is achieved.

It has been shown that when the starting product (yogurt, thick milk, kefir, curds and the like) dehydrated to one half to one seventh of its original weight is mixed with 4 to 40% unsaturated vegetable oil and vigorously stirred at room temperature without heating, the product obtained remains fresh a long time and the different bacteria of the starting product remain active, which for subsequent processing can be of importance.

The protein molecules have the geometric form of elliptical goblets. These molecules blend together, when the water of the whey is removed in transport or further dehydration or through deep freeze. They can no longer be regenerated, the mass becomes pasty and unpalatable. It is otherwise with the addition of unsaturated vegetable oil. Through homogenation of the dehydrated starting product with unsaturated vegetable oil the protein molecule form remains undisturbed and therefore retains the water necessary in the molecule. Thereby the product in accordance with the invention is stable. Thus with the base material obtained in accordance with the invention, all of the properties of the starting material can months later be bacterially revived, preferably with the simple addition of milk and corresponding warming, so that there is then obtained a product like fresh yogurt, kefir, curd etc.

If yogurt is used as the starting material for the production of this food product, difficulty can be experienced in certain cases in achieving a creamy to solid consistency. It is surprisingly found that this creamy to solid consistency can be obtained when, after the dehydration and before stirring or at the beginning of stirring, milk or citric acid is added. It is sufficient to add 2 to 4% milk or concentrated citric acid. This material works like a catylizer.

The desired degree of viscosity of the product is advantageously obtained through stirring and the addition of milk and/or milk powder, water, vinegar, or meat broth until the desired creamy consistency is achieved.

It has been found that more oil must be added when there is less dehydration.

If the product is used as a base material, there can be created food products of a variety of tastes which through their creamy consistency are found especially fine. These specialties are produced in a manner that after or during the stirring process in which the dehydrated milk protein is combined with edible oil, the additives are added in particular:

sugar and possibly other additives such as cocoa, fruit, nuts, malt, cereal products, flavoring, fruit sugar and/or dextrose possibly with other additives fruit, in particular in small pieces, dried, ground or pulverized form but also as marmalade, jelly, raw, cooked or candied, vegetables, in particular in comminuted, raw, cooked or dried, ground, pulverized form, cheese, in particular in comminuted, dried, pulverized form, meat or meat products in different forms.

All of these specialties are distinguished through their creamy consistency as tasty, smooth, outstandingly aromatic food products.

The sweetening through the addition of sugar leads to deserts and sweet bread spreads which are gladly consumed in particular by children.

The addition of fruit sugar and/or dextrose leads to sweet bread spreads which are especially suitable for diabetics.

The addition of fruits in different forms leads on the one hand to deserts and on the other hand likewise to bread spreads which in contrast to marmalade can contain raw fruit and thus are distinguished through a particular nutritional value on account of the vitamins inherent in the fruit.

The addition of herbs and vegetables leads on the one hand to food products which can be served as salads and on the other hand as bread spreads in which the herb-cheese and herb-curd preparations are distinguished by their especially creamy consistency.

The use of cheese as an additive has a special significance. Here the cheese component can be prepared in different forms and the creamy based material added. These cheese components can be grated, they can be dried and finally be reduced to powder form. They can also be sliced. The creamy product with this cheese additive has the consistency and taste of a good melted cheese without melt salts being introduced in the product.

But also the addition of meat or meat products opens entirely new fields of use because also here meat remnants as well as dried meat can be used.

An inexpensive way of producing a further spread is the addition of different bacteria which lead to an aromatization in smell and taste, for example through addition of lipase, diverse cheese bacteria among others.

The creamy product obtained can also be used as the base material for a series of further food products. The production of a mayonaise-like food product is possible; thick creamy sauces and soups can be produced with this base material.

Thereby cholesterol-free or at least low cholesterol products are produced, pure natural products without melt salt, hardening means, nickel catalysts and other media regarded as harmful to health. The products are distinguished by good keeping quality also without preservatives. They are producible economically, are distinguished through being protein-rich and fat-poor and are also outstandingly usable as diet food. The dehydration can be effected up to the hydrophobic limit; but it must not be too great.

For the production of an especially delightful desert but which also is usable as a bread spread it is expedient when, as the oil, raw sesame oil, nut oil, peanut oil, also with the addition of pulp of these kinds of oil are used and sugar is added during the stirring.

The production of these food products succeeds so much the better when vegetable oil with a high content of one or more unsaturated fatty acids is used. Thus unsaturated vegetable oils are used for the production. The use of animal oil and fat, but also hardened vegetable fat does not lead to the desired result.

However, after its production with unsaturated vegetable oils the food product, according to the invention, can be mixed with allowed fatty acids and solid fats such as butter and margarine, among others, in particular also with the raw material of margarine. In contrast with margarine, however, this food product can contain living bacteria and thereby is advantageous in its nourishment properties.

In the carrying out of the process in accordance with the invention additional reactions occur whereby the dehydrated, milk protein containing material is altered in a remarkable manner.

If curds, yogurt, kefir or other milk protein in flocculent form containing material is dehydrated and stored it is not possible through the addition of water or milk to produce again the original product of curds, yogurt or kefir. During the dehydration and the storing the milk protein is so altered and damaged that restoration is not possible. Thus these dehydrated products can be used only for the production of cheese. However, if directly after the dehydration, unsaturated vegetable oil is added and the dehydrated milk protein containing material is stirred at room temperature, without the addition of heat with the unsaturated vegetable oil so that an intimate mixing takes place, there appears a surprisingly quite different picture, it is found namely that through the addition of milk, in particular skimmed milk there is obtained a product which is like the starting product in appearance, consistency and taste when this product is allowed to stand six hours or more prior to consumption.

Surprisingly the product, in accordance with the invention, also opens a second manner of use namely making milk products cheaper to transport and at the same time longer storable. One can hereby proceed in the manner that from the milk product 50% to 75% of its weight constituent is withdrawn, it is mixed with not too much unsaturated vegetable oil in accordance with the invention, is then stored and transported and finally milk in any form or in the form of milk prepared from dry milk and water instead of the withdrawn water up to 25% and more and then the whole is intimately mixed with one another and allowed to stand before consumption.

By this process the weight of the milk product is reduced about 50% to 85% and likewise its volume is reduced a similar amount. That reduces the cost of transport in countries in which milk is not available in sufficient quantity, about half the transport cost. Surprisingly it has been shown that the milk product reduced in this manner in its weight and its volume has longer keeping properties than untreated milk, also at higher storage temperatures. There is also the possibility of transporting this product without the provision of cooling. The cost of transportation is thereby further reduced.

However, there is also the possibility of deep freezing and longer storage. If in the product in accordance with the invention half the bacteria are killed, this preserved mass can be revived through the addition of new bacteria.

However, the addition simply of water does not suffice to attain again the original product. It must be milk, in particular skimmed milk. For the transport in southern lands with limited milk production this can especially advantageously be milk produced of dried skimmed milk.

As a particular advantage it has been found that when to the dehydrated milk protein containing material three to ten weight percent of unsaturated vegetable oil is added and then stirred at room temperature, without the addition of heat, this product can be stored and/or transported and then to the product, milk, in particular skimmed ilk also in sterilized or pasturized or concentrated form or milk produced from milk powder is added with stirring and product then allowed to stand at least six more hours before consumption in order to come to the original product or when further unsaturated vegetable oil is added to the stored and transported product with stirring in order to attain the bread spread or the base material for the production of food product specialties.

Through the invention there is thus created a food product that can be used as a diatetic food product on account of its limited content of fatty acids and its high content of protein, which without the addition of conservatives is storable at normal temperatures for at least ten to fourteen days and which can be used in many possibilities. The possibilities of use are in three large groups, namely the production of a low fat, protein rich bread spread of neutral taste which can be substituted for butter and margarine, in a base material for the production of food product specialties and the third possibility of cheap transport in milk-poor especially southern countries. Among the food product specialties are especially to be mentioned a nut-nougat cream, which can be produced from the dehydrated milk protein containing material through the addition in particular of nut oil, palm oil and sesame oil as well as cheese specialties which are produced from the base material and ground old cheese pieces, which in other manner could be used solely for the production of melted cheese. Through this possibility tasty outstanding cheese specialties can be produced.

The special merit of the food product in accordance with the invention is not only in the multiplicity of possibilities of its use, but above all the natural character of the product. No preservatives are necessary, there are no residues of heavy metal catylists and no salt as in melted cheese preparations in the products produced in accordance with the invention.

I claim:

1. A process of producing a food product consisting of:

dehydrating water from a starting material selected from the group consisting of curds, yogurt and kefir to reduce its weight 50% to 85%, and directly thereafter adding vegetable oil to the resulting dehydrated material in an amount equal to 4% to 40% of the weight of said dehydrated material, said vegetable oil having a high content of unsaturated fatty acids, and stirring said dehydrated material and said added oil at room temperature, without the addition of heat, until there is obtained a product of soft, creamy consistency with a solidity similar to that of butter.

2. A process according to claim 1 in which said stirring is continued until an essential part of protein molecules of said dehydrated material have entered into chemical combination with oil molecules of said added oil.

3. A process according to claim 1, in which said dehydration of said starting material is effected in a centrifuge at low velocity.

4. A process of producing a food product consisting of:

dehydrating water from yogurt to reduce its weight 50% to 85%, directly thereafter adding vegetable oil to the resulting dehydrated yogurt in an amount equal to 4% to 40% of the weight of said dehydrated yogurt, said vegetable oil having a high content of unsaturated fatty acids, and stirring said dehydrated yogurt and said added vegetable oil at room temperature, without the addition of heat, until there is obtained a product of soft, creamy consistency with a solidity similar to that of butter, and adding 2% to 4% by weight of milk to said dehydrated yogurt before or at the beginning of said stirring.

5. A process of producing a food product consisting of:

dehydrating water from a starting material selected from the group consisting of curds, yogurt and kefir to reduce its weight 50% to 85%, directly thereafter adding vegetable oil to the resulting dehydrated material in an amount equal to 4% to 40% of the weight of said dehydrated material, said vegetable oil having a high content of unsaturated fatty acids, and stirring said dehydrated material and said added oil at room temperature, without the addition of heat, until there is obtained a product of soft, creamy consistency with a solidity similar to that of butter, and adding 2% to 4% by weight of citric acid to said dehydrated material before or at the beginning of said stirring.

6. A process of producing a food product consisting of:

dehydrating water from a starting material selected from the group consisting of curds, yogurt and kefir to reduce its weight 50% to 85%, directly thereafter adding vegetable oil to the resulting dehydrated material in an amount equal to 4% to 40% of the weight of said dehydrated material, said vegetable oil having a high content of unsaturated fatty acids and stirring said dehydrated material and said added oil at room temperature, without the addition of heat, until there is obtained a product of soft, creamy consistency with a solidity similar to that of butter, and adding, during or after said stirring, at least one fruit in comminuted form.

7. A process of producing a food product consisting of:

dehydrating water from a starting material selected from the group consisting of curds, yogurt and kefir to reduce its weight 50% to 85%, directly thereafter adding vegetable oil to the resulting dehydrated material in an amount equal to 4% to 40% of the weight of said dehydrated material, said vegetable oil having a high content of unsaturated fatty acids and stirring said dehydrated material and said added oil at room temperature, without the addition of heat, until there is obtained a product of soft, creamy consistency with a solidity similar to that of butter, and adding, during or after said stirring, at least one vegetable in comminuted form.

8. A process of producing a food product consisting of:

dehydrating water from a starting material selected from the group consisting of curds, yogurt and kefir to reduce its weight 50% to 85%, directly thereafter adding vegetable oil to the resulting dehydrated material in an amount equal to 4% to 40% of the weight of said dehydrated material, said vegetable oil having a high content of unsaturated fatty acids and stirring said dehydrated material and said added oil at room temperature, without the addition of heat, until there is obtained a product of soft, creamy consistency with a solidity similar to that of butter, and adding, during or after said stirring, at least one meat in comminuted form.

9. A process of producing a food product consisting of:

dehydrating water from a starting material selected from the group consisting of curds, yogurt and kefir to reduce its weight 50% to 85%, directly thereafter adding vegetable oil to the resulting dehydrated material in an amount equal to 4% to 40% of the weight of said dehydrated material, said vegetable oil having a high content of unsaturated fatty acids and stirring said dehydrated material and said added oil at room temperature, without the addition of heat, until there is obtained a product of soft, creamy consistency with a solidity similar to that of butter, and adding, during or after said stirring, cheese in comminuted form.

10. A process of producing a food product consisting of:

dehydrating water from a starting material selected from the group consisting of curds, yogurt and kefir to reduce its weight 50% to 85%, directly thereafter adding vegetable oil to the resulting dehydrated material in an amount equal to 4% to 40% of the weight of said dehydrated material, said vegetable oil having a high content of unsaturated fatty acids and stirring said dehydrated material and said added oil at room temperature, without the addition of heat, until there is obtained a product of soft, creamy consistency with a solidity similar to that of butter, and allowing said food product to stand for a period of days, adding skimmed milk to said product and again stirring said product and added milk.

11. Process for the production of a food product, in particular for use as a spread for bread, creamy food or a base for the production of specialties, consisting of dehydrating water from a starting material selected from the group consisting of curds, yogurt and kefir to reduce its weight 50% to 85%, adding to said dehydrated starting material additives consisting of two to four weight percent of milk or citric acid and four to forty weight percent of unsaturated vegetable oil, and stirring said dehydrated starting material with said additives at room temperature without the addition of heat until there is obtained a product of soft creamy consistency with a texture similar to that of butter.

12. A food product produced by the process of claim 1.

13. A food product produced by the process of claim 11.

* * * * *